United States Patent
Lee

(10) Patent No.: US 6,742,238 B2
(45) Date of Patent: Jun. 1, 2004

(54) FLARE TOOTH STATOR FOR AN AC GENERATOR

(75) Inventor: James A. Lee, Yorktown, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/924,802

(22) Filed: Aug. 8, 2001

(65) Prior Publication Data

US 2003/0030350 A1 Feb. 13, 2003

(51) Int. Cl.[7] ............................................... H02K 15/16
(52) U.S. Cl. .............................. 29/596; 29/598; 29/605; 29/732; 310/216; 310/254
(58) Field of Search ............................ 29/596, 598, 605, 29/606, 732, 736; 310/216, 254, 154, 156

(56) References Cited

U.S. PATENT DOCUMENTS

| 92,152 A | * | 7/1869 | Asao et al. ..................... 29/596 |
|---|---|---|---|
| 2,407,935 A | | 9/1946 | Perfetti et al. ................ 171/206 |
| 3,860,744 A | | 1/1975 | Schuler .................. 174/117 FF |
| 3,953,753 A | | 4/1976 | Barrett ......................... 310/168 |
| 4,102,040 A | * | 7/1978 | Rich ............................ 29/598 |
| 4,176,444 A | * | 12/1979 | Walker ......................... 29/596 |
| 4,613,780 A | | 9/1986 | Fritzsche ..................... 310/216 |
| 4,829,206 A | * | 5/1989 | Honshima et al. .......... 310/214 |
| 5,343,105 A | | 8/1994 | Sakabe et al. ............... 310/179 |
| 5,587,619 A | | 12/1996 | Yumiyama et al. ......... 310/201 |
| 6,020,661 A | * | 2/2000 | Trago et al. ................... 310/43 |
| 6,137,201 A | * | 10/2000 | Umeda et al. .............. 310/179 |
| 6,166,474 A | * | 12/2000 | Kohara et al. .............. 310/258 |
| 6,242,835 B1 | * | 6/2001 | Uemura et al. ............. 310/214 |

* cited by examiner

Primary Examiner—I Cuda Rosenbaum
Assistant Examiner—Stephen Kenny
(74) Attorney, Agent, or Firm—Jimmy L. Funke

(57) ABSTRACT

A stator core extends along a longitudinal axis and includes a yoke, and a plurality of radially-inwardly projecting teeth separated by intervening slots. A radially innermost portion of each tooth initially includes a pair of legs separated by a recess disposed therebetween. The conventional tooth tips are unformed in the first stage, thereby defining an increased-size slot opening for allowing the insertion of stator windings. In a second processing stage, after the core itself has been manufactured and wound with stator windings, the legs are cold-formed in order to form tooth tips, which define a reduced-size slot opening to provide a magnetic flux path and provide a wire retention function. A higher stator slot fill is provided, which allows and enables higher generator efficiencies and output for a given package size.

2 Claims, 3 Drawing Sheets

US 6,742,238 B2

FLARE TOOTH STATOR FOR AN AC GENERATOR

BACKGROUND OF THE INVENTION

1. Technical Field

The present invention relates to a stator core of a dynamoelectric machine.

2. Description of the Related Art

Generators are found in virtually every motor vehicle manufactured today. These generators, also referred to as alternators, produce electricity necessary to power a vehicle's electrical accessories and charge a vehicle's battery. Generators must produce electricity in sufficient quantities to power a vehicle's electrical system. Furthermore, generators must produce electricity having the characteristics necessary to be compatible with a vehicle's electrical components. A generator typically includes a stator assembly comprising a stator core and a stator winding, and a rotor.

U.S. Pat. No. 3,953,753 issued to Barrett entitled "THREE PHASE ALTERNATORS" disclose a three phase alternator suited for automotive use having an annular magnetic stator core having a plurality of stator poles projecting therefrom, and separated from each other by a corresponding plurality of stator slots. Each slot has an open bottom formed by tooth tips of adjacent stator teeth. The slot opening is relatively narrow, compared with a width of the slot itself, as is conventional, so as to provide both a magnetic flux path and provide for wire retention. However, the relatively narrow slot opening formed by the tooth tips, which are typically stamped directly into a steel lamination into the desired profile, restricts entry of the stator windings. Accordingly, obtaining an increasingly higher stator slot fill (i.e., the percentage of copper wire total cross-sectional area to available cross-sectional area) is difficult to achieve.

There is therefore a need to provide a stator core for a dynamoelectric machine that minimizes or eliminates one or more of the problems set forth above.

SUMMARY OF THE INVENTION

One object of the present invention is to provide a stator core for a dynamoelectric machine such as an alternating current (AC) generator that solves one or more of the problems set forth above. The present invention provides a slot opening that is increased relative to conventional slot openings (i.e., when compared to the width of the slot itself). The increased size slot openings allow stator windings to be more easily inserted into the slots, and further, provides for an increased slot fill. Thereafter, the slot opening is closed up in order to provide a magnetic flux path and further to provide for wire retention. This is accomplished by cold-forming the ends of the stator teeth after the core itself has been made and wound with the stator winding to form "tooth tips."

In accordance with the present invention, a stator assembly for a dynamoelectric machine is provided, and which includes a stator core having a yoke, a plurality of teeth separated by intervening slots. The stator core extends along a longitudinal axis. A radially innermost portion of at least one of the teeth includes a pair of legs with a recess located therebetween. The arrangement of the legs and the recess facilitates the cold-working of the stator teeth to form the tooth tips.

A method of making a stator assembly according to the invention is also presented.

Other features and advantages will be apparent to those of ordinary skill in the art from the detailed description and accompanying drawings describing and illustrating the invention by way of example only and not by way of limitation.

BRIEF DESCRIPTION OF THE DRAWINGS

The operative features of the present invention are explained in more detail with reference to the drawings.

DETAILED DESCRIPTION OF THE PREFERRED EMBODIMENTS

Figure 1:
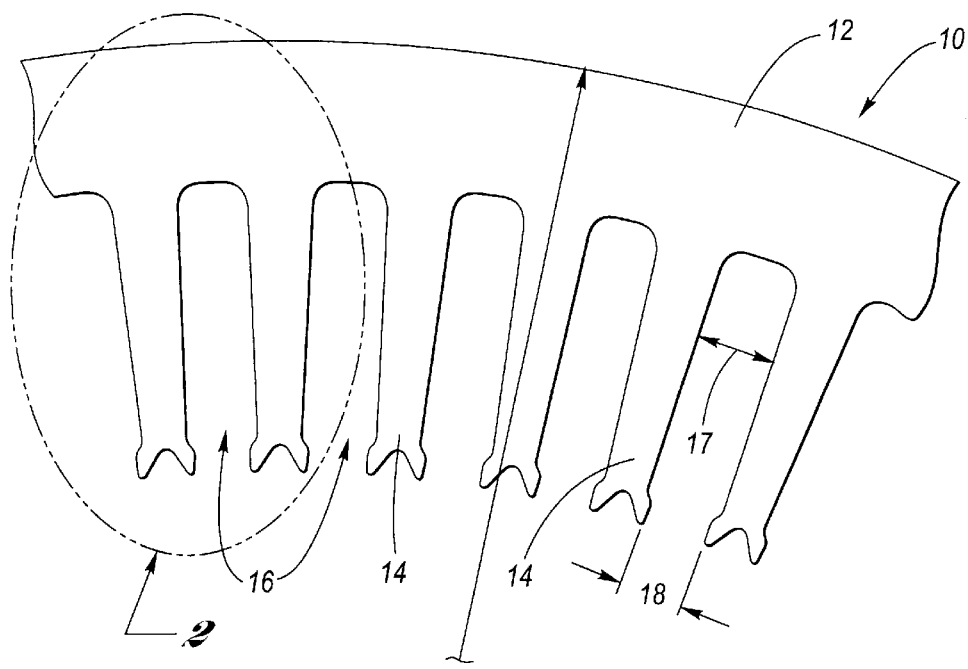
FIG. 1 is a partial, plan view of a stator core according to the present invention.

Referring now to the drawings wherein like reference numerals are used to identify identical components in the various views, FIG. 1 is a partial plan view of a stator core 10 in accordance with the present invention. Core 10, as shown, includes a yoke 12, a plurality of teeth 14, and a plurality of intervening slots 16. Each slot 16 has a nominal slot width 17, and a slot opening having a width 18. The stator core 10 shown in FIG. 1 is that produced after a first stage of manufacturing, but prior to insertion of stator windings, and a cold-forming operation to form tooth tips to be described in detail hereinafter. Stator core 10 is generally cylindrical having a main longitudinal axis "A" (best shown in FIG. 6), which may be described as extending into the paper of FIG. 1 at center point 19. Stator core 10 has an outside diameter of radius R, as shown. The relative radial length in FIG. 1 has been foreshortened in relative scale for clarity of illustration purposes only. Core 10 is suitable for use in a stator assembly for a dynamoelectric machine, such as an AC generator for an automotive vehicle. In a preferred embodiment, a plurality of relatively thin, generally circular laminations are stamped or otherwise formed from suitable magnetic material (e.g., silicon steel or the like), and are then adhered together in a stack having a predesired axial length, as understood generally by one of ordinary skill in the art.

Figure 2:
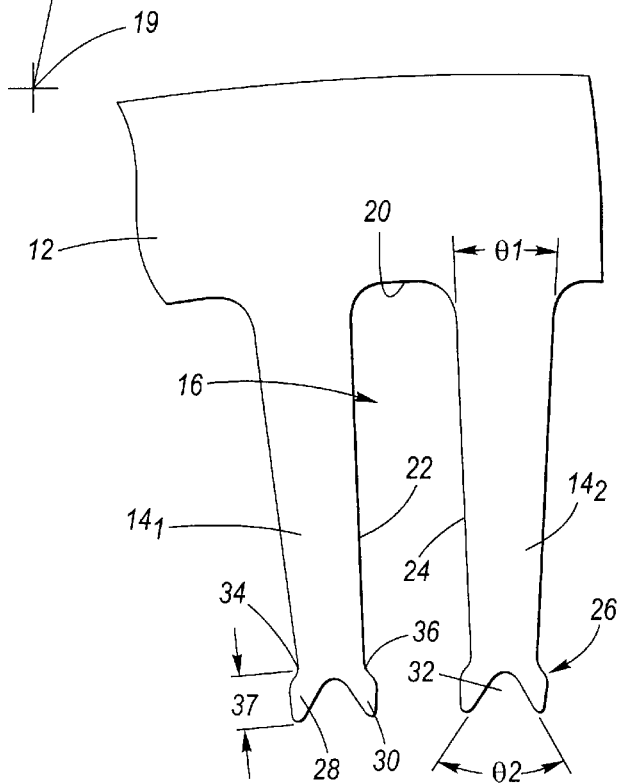
FIG. 2 is an enlarged view of a pair of adjacent stator teeth corresponding to the encircled portion shown in FIG. 1.

FIG. 2 is an enlarged view of the portion of FIG. 1 encircled in phantom line. Each slot 16 is formed by adjacent teeth, shown in FIG. 2 as adjacent teeth $14_1$ and $14_2$. Slot 16 is configured to receive stator windings, as known in the art. Slot 16 includes a top 20 adjacent to yoke 12 and a pair of sides 22 and 24 defined by adjacent teeth $14_1$ and $14_2$ (in addition to an open bottom defining slot opening 18 described in connection with FIG. 1). In the illustrated embodiment, sides 22 and 24 are generally parallel over the radial extent of teeth $14_1$ and $14_2$.

Tooth 14, in the illustrated embodiment, circumscribes a predetermined angle θ1 taken relative to center point 19 (best shown in FIG. 1). In one embodiment, θ1 is approximately 5 degrees, forming a 72-tooth, 72-slot, stator core 10.

One advantage of the present invention is that it provides an increased slot opening 18 relative to the width 17 of slot 16. Preferably, the slot opening 18 is greater than about 75 percent of the slot width 17, more preferably greater than about 80 percent, and in a constructed embodiment, is approximately 83 percent (i.e., a slot opening of 0.1005 inches/a slot width of 0.1205 inches). The increased slot opening is achieved by producing (e.g., stamping) the profile shown in FIG. 1, and deferring formation of the tooth tips until after the core 10 itself has been made and wound with stator windings. To facilitate forming the tooth tips, a variety of features initially are formed on a radially innermost portion of the plurality of teeth 14 (first tips 26). In particular, each tooth 14 includes (i) a pair of legs 28; (ii) a recess 32 disposed therebetween, and (iii) a pair of relief radii 34 and 36.

Recess 32 is formed, in part, by the inner sides of legs 28 and 30. The inner sides form a predefined angle $O_2$ relative to each other. The predefined angle $O_2$ may be at least about 45 degrees, more preferably at least about 60 degrees, and may be about 66 degrees in a constructed embodiment (e.g., 66.1552 degrees). The recess 32 has a radial extent that is at least one-half of the radial extent 37 of legs 28 and 30, and, more preferably, approximately the same radial extent as legs 28 and 30.

Figure 3:
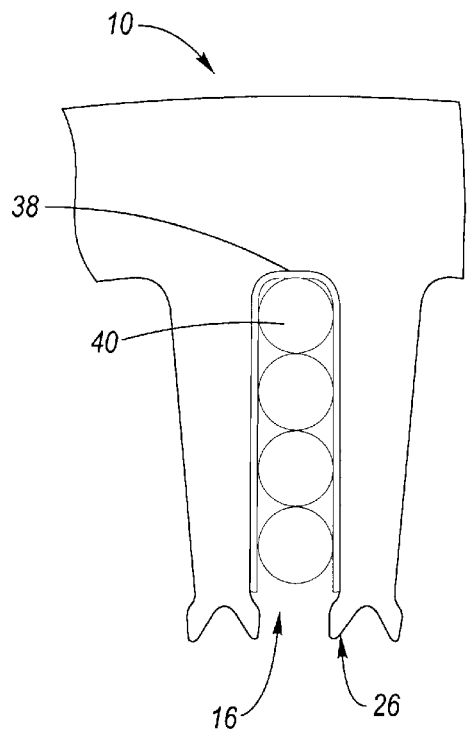
FIGS. 3–5 are simplified, plan views of a pair of adjacent stator teeth illustrating the progression of the tooth tip forming method according to the invention.
Figure 4:
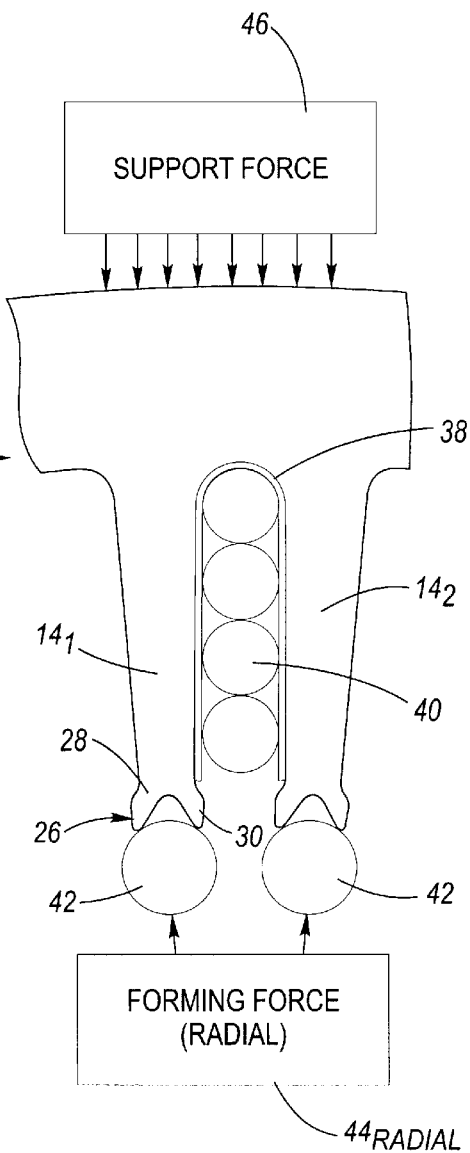
Figure 5:
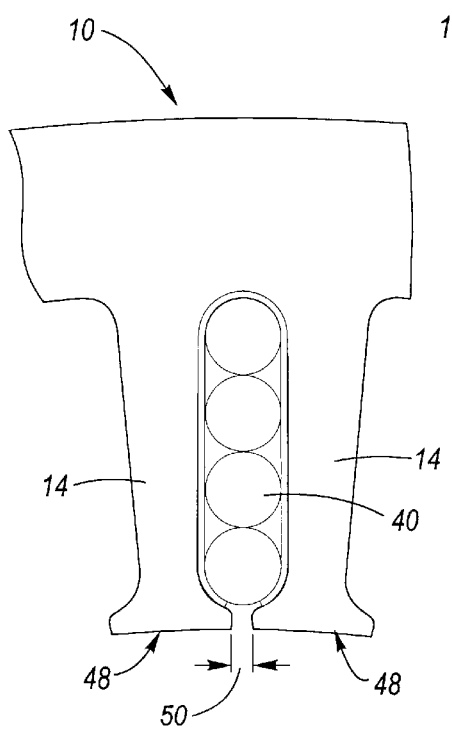

FIGS. 3–5 show the progression of a method of manufacturing stator core 10 according to the invention. FIG. 3 shows a first stage, where stator core 10 has a stator slot liner (insulator) 38 disposed in slot 16, and where stator windings 40 (e.g., copper magnet wire) have been inserted in the liner 38. Alternatively, the slot liner can be omitted and a powder coat of insulating material can be used in lieu thereof.

FIG. 4 shows the next stage, particularly, the beginning of a cold-forming operation on the radially innermost ends of teeth $14_1$ and $14_2$ to form final tooth tips. FIG. 4 shows a suitably configured forming tool (e.g., a suitably sized ball arranged in a ball roller configuration 42). Ball roller 42 is shown disposed against legs 28 and 30 of teeth 14. FIG. 4 also shows the radial forces, designated $44_{RADIAL}$ that are applied during the cold-forming operation. A support force, designated support force 46, is employed such as by providing a reaction surface or in other known ways.

The ball roller 42 is rolled along the bottom of tooth 14 (i.e., the inside diameter of the stator core 10) in an axial direction. This movement deforms the material at the bottom (i.e., radially innermost) of tooth 14 to define a final tooth tip 48.

FIG. 5 illustrates the final or completed stage where the tooth tip 48 is newly formed on a radially innermost portion of each tooth 14. As a result of the cold-forming operation, a second slot opening width 50 is established that is smaller than the first slot opening width 18 shown in FIG. 1. The closed up slot width provides a magnetic flux path, and further functions to retain the stator windings 40.

Figure 6:
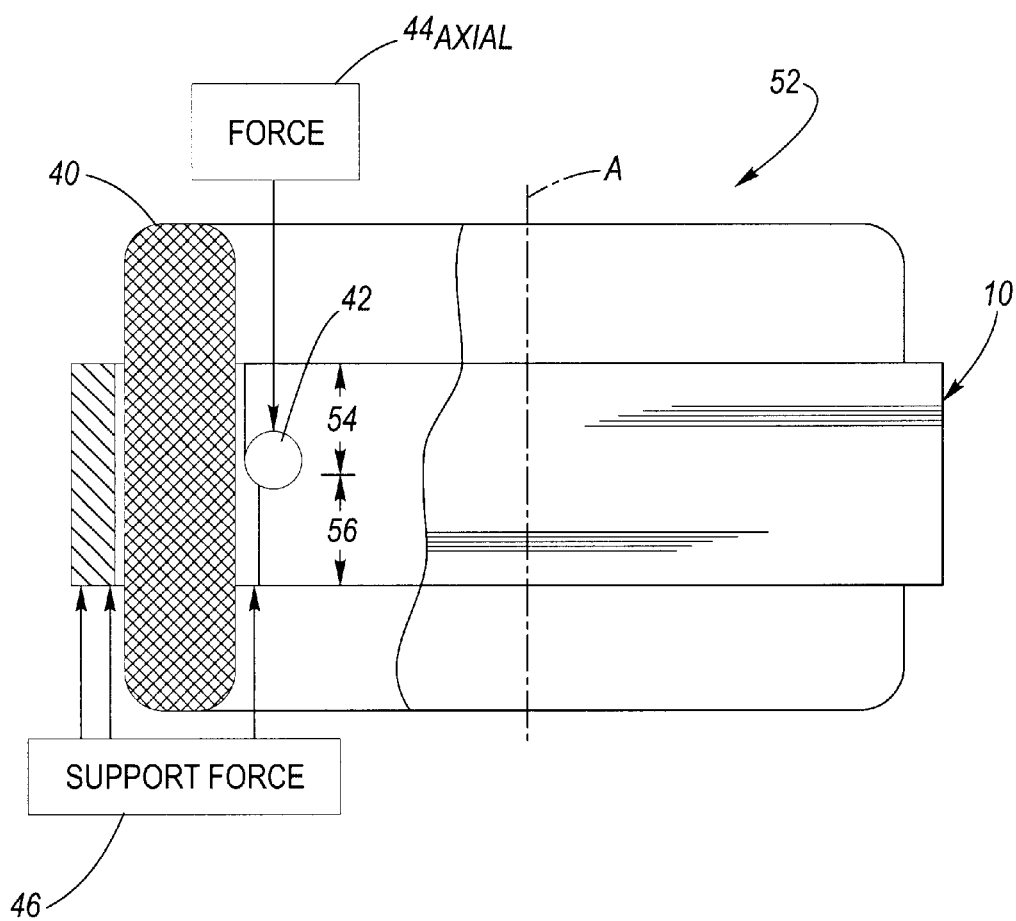
FIG. 6 is a diagrammatic view of a stator assembly, with portions broken away and sectioned, showing a cold-forming operation according to the invention.

FIG. 6 is a simplified view of a stator assembly 52 that includes a stator core 10, with portions broken away and sectioned. FIG. 6 shows an axial force, designated $44_{AXIAL}$ that is applied by the ball roller 42 to the stator teeth 14. FIG. 6 also shows longitudinal axis "A." In accordance with the invention, in another embodiment, during the cold-forming operation, a first portion of core 10, designated first axial portion 54, is deformed using ball roller 42. This is done by commencing the forming operation at a first axial end of stator core 10 and proceeding in a first axial direction (e.g., in the down direction given the orientation of assembly 52 in FIG. 6). The stator assembly 52 is then turned over, and the remaining axial portion, designated second axial portion 56, is worked. This is done by commencing the cold-forming operation at a second axial end of stator core 10 (the bottom end in FIG. 6) and proceeding in a second axial direction opposite the first axial direction mentioned above (i.e., in the up direction in FIG. 6). The foregoing steps are performed so that forces from the ball roller 42 do not cause the individual laminations that form stator core 10 to separate at the bottom edge of the stack as the ball roller exits.

In accordance with the invention, instead of stamping the final (relatively narrow) tooth tip profile into a stator lamination, an alternate tooth-end configuration yielding a wide slot opening is initially made (e.g., stamped). Then the tooth tips are cold-formed on the radially-innermost ends of the stator teeth after the stator core itself has been manufactured and wound with magnet wire. The features of the invention allow the stator winding to be inserted through an increased-size slot opening compared to the slot openings found in conventional arrangements. The foregoing increase in size allows a larger size conductor to be inserted in the slot, thereby obtaining a higher stator slot fill, which allows and enables a higher generator efficiency and output for a given package size. After winding, the enlarged slot opening is closed up using, for example, a cold-forming operation. The closed up slot opening which is now reduced in width (akin to a conventional slot opening) provides a magnetic flux path, and further provides a wire retention function.

What is claimed is:

1. A method of making a stator assembly comprising the steps of:

producing a generally cylindrical stator core that extends along a longitudinal axis and that has a yoke portion, and a plurality of radially-inwardly projecting teeth separated by intervening slots wherein at least one slot has a slot opening having a first width, said producing step includes the substep of forming on the radially innermost end of at least one tooth a pair of legs separated by a recess disposed therebetween wherein said recess opens toward a centerpoint of the stator assembly;

after producing said stator core, inserting a stator winding in the slots; and after inserting said stator winding, deforming the radially-innermost portion of the teeth to produce a slot opening having a second width that is less that the first width, said deforming step including the substep of cold-working the at least one tooth by seating a deforming tool between the legs of the stator tooth and moving the deforming tool, beginning at the first axial end, in a first axial direction for a predetermined portion of an axial length of the stator core; and moving the tool, beginning at the second axial end, in a second axial direction opposite the first axial direction for a remainder of the axial length so as to deform the legs laterally toward adjacent slots so as to deform the material at the radially innermost portion of the tooth to define a final tooth tip.

2. A method of making a dynamoelectric machine comprising the steps of:

providing a generally cylindrical stator core having a main axis and including a plurality of teeth separated by intervening slots wherein at least one slot has a slot opening, said providing step includes the substep of forming on the radially innermost end of at least one tooth a pair of legs separated by a recess disposed therebetween wherein said recess opens toward a centerpoint of the stator assembly;

after providing said stator core, inserting stator windings, having a width substantially equal to a slot width, through the slot openings into the slots; and after inserting said stator windings, deforming the radially innermost portion of said teeth so as to reduce the slot openings, said deforming step including the substep of cold-working the at least one tooth by seating a deforming tool between the legs of the stator tooth and moving the deforming tool, beginning at the first axial end, in a first axial direction for a predetermined portion of an axial length of the stator core; and moving the tool, beginning at the second axial end, in a second axial direction opposite the first axial direction for a remainder of the axial length so as to deform the legs laterally toward adjacent slots so as to deform the material at the radially innermost portion of the tooth to define a final tooth tip.

* * * * *

UNITED STATES PATENT AND TRADEMARK OFFICE
CERTIFICATE OF CORRECTION

PATENT NO. : 6,742,238 B2
DATED : June 1, 2004
INVENTOR(S) : Lee et al.

It is certified that error appears in the above-identified patent and that said Letters Patent is hereby corrected as shown below:

<u>Title page,</u>
Item [75], Inventors, please add: -- Michael Duane Bradford, Anderson, IN (US) --

Signed and Sealed this

Twenty-eighth Day of December, 2004

JON W. DUDAS
*Director of the United States Patent and Trademark Office*

UNITED STATES PATENT AND TRADEMARK OFFICE
CERTIFICATE OF CORRECTION

PATENT NO.   : 6,742,238 B2
DATED        : June 1, 2004
INVENTOR(S)  : Lee

It is certified that error appears in the above-identified patent and that said Letters Patent is hereby corrected as shown below:

<u>Title page,</u>
Item [75], Inventors, please add -- Michael Duane Bradfield, Anderson, IN (US) --

Signed and Sealed this

Tenth Day of May, 2005

JON W. DUDAS
*Director of the United States Patent and Trademark Office*